Figure 1:
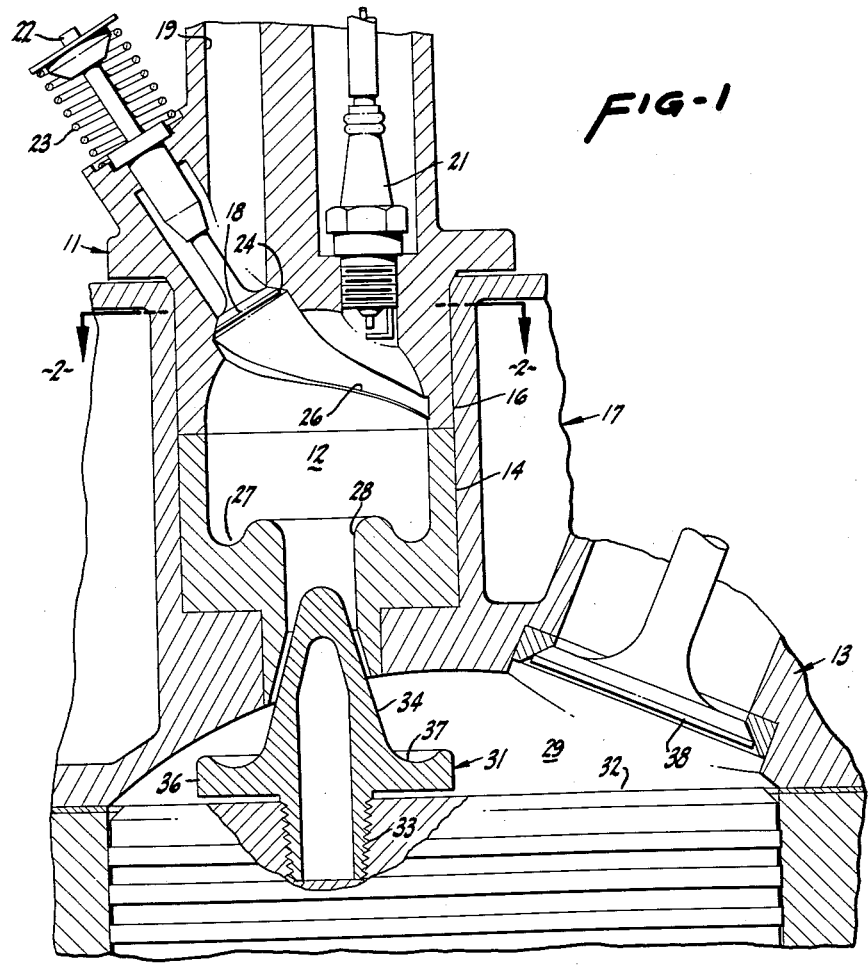

May 9, 1961 R. M. HEINTZ 2,983,268
INTERNAL COMBUSTION ENGINE
Filed May 7, 1959

INVENTOR.
RALPH M. HEINTZ
BY Alvin E. Henderson
ATTORNEY

_United States Patent Office_

2,983,268
Patented May 9, 1961

2,983,268

INTERNAL COMBUSTION ENGINE

Ralph M. Heintz, P.O. Box 546, Los Gatos, Calif.

Filed May 7, 1959, Ser. No. 811,701

9 Claims. (Cl. 123—191)

The present invention relates to an improvement in internal combustion engines and more particularly to an improvement in auxiliary combustion chamber configurations and associated elements adapted for utilization with internal combustion engines to the end of effecting substantially complete fuel combustion in the engine.

Although the present invention is adapted for utilization with various types of internal combustion engines, particular advantage is realized by utilizing this invention in cooperation with the internal combustion engine disclosed and claimed in my copending United States patent application Serial No. 721,588, filed March 14, 1958, now patent No. 2,884,913, granted May 5, 1959. The present invention, in fact, relates to improvements in the engine disclosed in such application and thus reference is herein made to the same for a clear and complete explanation of the structure and operation of the entire engine. The following description is referenced to the internal combustion engine described in my above-noted patent application, and thus a description of engine components not directly related to improvements of the present invention are not included herein.

The internal combustion engine disclosed in my above-noted patent application includes, in brief, the provision of an auxiliary combustion chamber for each cylinder of an otherwise substantially conventional internal combustion engine for the purpose of furthering the completeness of combustion within normal operating range of an automotive engine. Both air and fuel are delivered to the auxiliary chamber and ignition is accomplished therein, with the auxiliary chamber then being opened to the main combustion chamber for substantially complete burning of the fuel therein. In the engine under consideration, it has been determined that at idling speeds, the engine operates substantially as an external combustion engine, wherein the majority of combustion occurs in the auxiliary chamber, and at or near full power, the engine operates substantially on a conventional Otto cycle. In the intermediate power range, however, operation is materially modified from normal and inasmuch as automotive engines are operated in the intermediate power range the majority of the time, a very substantial variation in engine operation is thereby realized.

In the intermediate power range of the internal combustion engine of my above-identified patent application, there is provided substantially unthrottled air flow to the main combustion chamber. Although some fuel may be mixed with this air to the main combustion chamber, there is provided a great overabundance of air to the main combustion chamber. The majority of fuel is admitted to the auxiliary combustion chamber, together with air to support combustion therein, however an overabundance of fuel is provided to the auxiliary combustion chamber. Ignition is initiated in the auxiliary combustion chamber rather than in the main combustion chamber, and by stratification of the charge in the auxiliary chamber, as discussed in my above-referenced patent application, a combustible mixture is maintained in the vicinity of the ignition means. By maintaining the auxiliary combustion chamber substantially closed during ignition and immediately following same, a very high pressure is built up in the auxiliary chamber. Opening of the auxiliary chamber to the main combustion chamber then provides an egress passage for the burning charge in the auxiliary chamber to enter the main combustion chamber and therein completely burn in the overabundance of air provided therein. A certain amount of a fuel in the auxiliary combustion chamber is ignited while yet in a liquid or even solid state and same is then directed into the main combustion chamber to provide a multitude of ignition points whereupon the charge in the main combustion chamber is ignited from a large plurality of points rather than from a single point as is conventional practice.

It will be appreciated that is is necessary to maintain the auxiliary combustion chamber substantially closed during initial ignition of the charge therein, and furthermore that the auxiliary combustion chamber is then preferably placed in full communication with the main combustion chamber in order that the burning charge may rapidly and evenly distribute itself throughout the main combustion chamber for completion of burning therein. Additionally, it is necessary to provide means for initially retaining within the auxiliary combustion chamber such fuel as may enter same in a liquid state in order that liquid fuel will not enter the main combustion chamber prior to ignition. In order to provide adequate scavenging of the auxiliary combustion chamber during that portion of the engine cycle, it is further advantageous to provide complete and relatively unobstructed communication between the main and auxiliary combustion chambers during the exhaust stroke of the engine. Furthermore, it is necessary to prevent undue concentration of fuel about the ignition means during the compression stroke of the engine piston in order to insure the provision of a combustible fuel-air mixture in the vicinity of the ignition means.

The present invention, through the provision of an improved auxiliary combustion chamber configuration and connection with the main combustion chamber, provides a highly advantageous solution to the above-noted problems connected with utilization of an auxiliary combustion chamber with the main combustion chamber of an internal combustion engine. By the provision of fuel-trapping means in the auxiliary combustion chamber it is herein possible to employ a large and substantially unobstructed passageway between the auxiliary combustion and main combustion chamber whereupon an improvement is realized in the discharge of burning fuel into the main combustion chamber as well as in the scavenging of the auxiliary combustion chamber. The further requirement of a substantially closed auxiliary combustion chamber during ignition is herein accomplished by the provision of means moving into and out of the communicating passage between the auxiliary and main combustion chambers. This means is herein utilized to serve the further purposes of deflecting the burning charge from the auxiliary combustion chamber throughout the main combustion chamber to thereby improve and hasten combustion therein, as well as to protect the piston from overheating. As a further feature of the present invention there is also provided means for protecting the inlet valve to the auxiliary combustion chamber and at the same time for directing air flow about the ignition means therein for the purpose of additionally insuring the presence of a combustible fuel-air mixture about the ignition means whereby misfiring is precluded.

It is an object of the present invention to provide an improved auxiliary combustion chamber configuration for internal combustion engines.

It is another object of the present invention to provide improved communication between auxiliary and main combustion chambers of internal combustion engines for maximized scavenging of the auxiliary combustion chambers while retaining charge stratification therein.

It is a further object of the present invention to provide improved deflection means for a burning charge expelled from an auxiliary combustion chamber into a main combustion chamber without restricting communication between such chambers.

It is yet another object of the present invention to provide air flow control means in an auxiliary combustion chamber of an internal combustion engine for insuring fuel ignition in such auxiliary chamber.

It is still a further object of the present invention to provide periodically unrestricted communication between auxiliary and main combustion chambers of an internal combustion engine while at the same time providing fuel retention means in the auxiliary combustion chamber insuring stratification of the charge in the auxiliary combustion chamber.

Yet another object of the present invention is to provide means for protecting pistons of an internal combustion engine for localized over-heating wherein auxiliary combustion chambers are employed.

Another object of the present invention is to provide means for substantially closing an auxiliary combustion chamber during ignition therein and providing full communication with a main combustion chamber immediately thereafter.

Various other possible objects and advantages of the present invention will become apparent to those skilled in the art from the following description and drawing illustrating and describing a single preferred embodiment of this invention. Although the invention is herein set forth with regard to a single preferred embodiment, no limitation is intended thereby but instead reference is made to the appended claims for a precise delineation of the true scope of this invention.

The present invention in brief includes an auxiliary combustion chamber for an internal combustion engine having a particular advantageous configuration for trapping unvaporized fuel therein as well as means directing incoming air in a controlled manner to insure the presence of a combustible charge in the vicinity of ignition means provided within the auxiliary chamber. Cooperating with the auxiliary combustion chamber and an otherwise unimpeded passage therefrom into the main combustion chamber, there is provided an element mounted upon an engine piston and formed to mate with the communicating passage. This element is alined with the above-noted communicating passage to substantially close same at top dead center of the piston travel for retaining the charge in said auxiliary chamber until ignition thereof is completed and pressure builds up therein. The element further provides a rapidly increasing communication between auxiliary and main chambers as the piston moves downward so that the compressed burning charge is ejected into the cylinder and is deflected by the element to distribute same substantially uniformly throughout the main combustion chamber and thereby provide an advantageous mixing with the atmosphere of the main combustion chamber.

Figure 2:
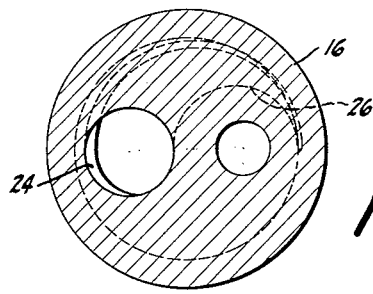

The present invention is illustrated in the accompanying drawing wherein:

Fig. 1 is a sectional view through a preferred embodiment of the combustion chamber of the present invention and showing in section the deflection and closing element mounted upon an engine piston; and Fig. 2 is a transverse sectional view taken in the plane 2—2 of Fig. 1.

Considering now the illustrated embodiment of the present invention in some detail, it is first noted that the invention is adapted for combination with a substantially conventional engine of the internal combustion type insofar as the arrangement of cylinders, pistons, connecting rods, crankshaft and intake and exhaust valves and their operative mechanisms are concerned. One of the great advantages of utilizing an auxiliary combustion chamber in an internal combustion engine lies in the achievement of substantially complete fuel combustion in the engine cylinder. This is accomplished by the provision of an overabundance of air in the main combustion chamber and the provision through an auxiliary chamber of fuel and air with the fuel-to-air ratio thereof being high. By stratification of the charge in the auxiliary combustion chamber it is possible to ignite the charge to thereby expel same through a communicating passage into the main combustion chamber of the engine wherein there the overabundance of air promotes complete fuel oxidation. Under certain power operations of internal combustion engines it is possible to provide only air as the charge of the main combustion chamber; however, under certain other circumstances it is advantageous to include a certain proportion of fuel in the charge. Throughout the intermediate power range or usual operating range of automotive engines, the charge within the main combustion chamber of the engine has at all times a substantial overabundance of air such that the fuel-to-air ratio is extremely small as contrasted to conventional practice. By the introduction into the main combustion chamber of a burning fuel and a subsequent distribution of same throughout the chamber it is then possible with the overabundance of air in such main combustion chamber to accomplish substantially complete oxidation or burning of such fuel. A maximum amount of energy is thereby derived from the fuel charge and furthermore a minimum amount of unburned fuel is exhausted from the engine.

The manifold advantages of such a system are evident for not only is the efficiency of the engine thereby materially increased, but also the toxicity of the exhaust therefrom is very substantially reduced. It is contemplated that there shall be provided in addition to the main inlet valve of the engine cylinder, an auxiliary inlet valve connected to the auxiliary combustion chamber and opening an auxiliary air duct therein through which there may be provided both air and fuel to the auxiliary chamber. Suitable connecting linkage may be provided between the main or primary inlet valve to the engine cylinder and the auxiliary inlet valve to the auxiliary combustion chamber whereby these valves are operated either in synchronism or with a predetermined time variation between their operation.

As shown in the drawing, there is provided a housing 11 defining therein an auxiliary combustion chamber 12 and disposed above the cylinder of an internal combustion engine 13. This housing 11 may be advantageously formed of a lower cup 14 and upper cup 16 joined together and fitted within an aperture in the engine block 17. Within the upper half or cup 16 of the housing 11 there are formed an inlet port 18 communicating between the auxiliary chamber 12 and an air inlet duct 19, and a spark plug opening having ignition means such as a spark plug 21 threaded therein adjacent to the inlet port 18. An auxiliary inlet valve 22 is provided within the inlet port 18 to seat therein and under the influence of such as valve springs 23 to remain normally closed thereby disconnecting the inlet duct 19 from the auxiliary chamber 12. A valve seat 24 formed about the inlet port 18, serves to receive and seat the inlet valve 22 and this valve seat is inset by extension of the inlet port 18 into the housing wall away from the auxiliary chamber 12 so that the valve is, in effect, shrouded and consequently operates at a lower temperature than otherwise. A curved tapering channel 26 is formed in the housing 11 about the auxiliary chamber 12 extending from the port 18 generally about the ignition means or spark plug 21. This depression or channel 26 communicates with the side of the inlet port 18 on the auxiliary chamber side of the inlet valve 22 so that upon opening of this valve 22 by depression thereof against the spring pressure thereon, entering air from the inlet duct 19 will originally escape into the chamber through the channel 26 and will consequently tend to follow the contour thereof whereby such entering air is swirled about the ignition means or spark plug 21 to guarantee the provision of a combustible fuel and air mixture in the vicinity of such ignition means.

It is herein contemplated that the inlet valve 22 of the auxiliary combustion chamber 12 shall, in addition to admitting air to the auxiliary chamber, additionally control the flow of fuel such as, for example, gasoline or the like into the auxiliary chamber 12 and comprising the liquid portion of the combustion mixture. Such fuel entering the auxiliary combustion chamber 12 from behind the inlet valve 22 will originally be in a liquid form behind the valve, and although in part vaporized by the inrushing air from the duct 19, will remain in part in liquid form so as to thereby flow down the walls of the auxiliary combustion chamber. Provision is herein made for retaining such liquid fuel within the auxiliary combustion chamber until such time as ignition occurs and this provision takes the form of an annular fuel trough or trap 27 provided about the bottom of the auxiliary chamber in the lower portion 14 of the housing 11 thereof. Further regarding this lower portion 14 of the housing 11, same is herein provided with a central depending portion adapted to extend through the cylinder head 17 into the engine cylinder, as for example, through a conventional spark plug opening in such head. A central unobstructed passage 28 is formed axially through this depending cylindrical portion of the housing to thereby provide communication between the auxiliary combustion chamber 12 and the main combustion chamber 29 atop the cylinder of the engine. The fuel trap or trough 27 is herein formed by the provision of a reentrant configuration about the lower portion of the chamber 12, whereupon the passage 28 extends generally axially into the chamber and the housing wall thereabout is then depressed radially outward of such passage 28 to form an annular depression 27 about the passage. The lower portion of the passage 28 communicating with the main cylinder or combustion chamber 29 is flared or tapered radially outward so as to accommodate a similarly tapered nose cone of a movable closure or deflecting element 31.

Ignited and burning fuel will be expelled from the auxiliary combustion chamber 12 downward through the communicating passage 28 into the main combustion chamber 29 and in order to control the flow of such burning mixture there is mounted the above-noted deflecting element 31 upon the piston 32 of the engine. The element 31 is formed of a refractory material or other temperature resistant material and has a generally conical shape with the taper thereof substantially matching the taper of the communicating passage 28. The element 31 is mounted upon the engine piston 32 directly beneath the passage 28 and in alinement therewith so that upon reciprocal motion of the piston 32, element 31 will move into and out of engagement with the passage 28. Mounting of the element upon the piston may be accomplished by the provision of a cylindrical depending shank 33 upon the element 31 with external threads formed thereabout to engage tapered threads formed in an opening in the piston top. By proper dimensioning of the length of the shank 33 and the depth of the bore or opening in the top of the piston 32, mounting of element 31 may be accomplished by completely threading the shank thereof into the bore in the piston so as to engage the end of the shank with the bottom of the bore and yet maintaining the main portion of the element 31 displaced from the upper piston surface as shown. This displacement need only be of a minor nature as, for example, .010 inch, but serves the highly useful purpose of limiting the transmission of heat from the deflecting element to the piston. Further regarding the configuration of the deflecting element 31 same includes in addition to the above-noted conical nose 34, a radial projection 36 thereabout forming such as an annulus displaced radially outward of the base of the nose cone 34 and connected at the top surface thereof to this conical surface by a smoothly curving annular dished surface 37. The deflecting element 31 then provides an outer deflecting surface which tapers from the top thereof radially outward toward the bottom of the cone and thence through a smoothly curving surface 37 back up to the top of the annulus 36 toward the top of the combustion chamber 29. Consequently, hot gases or burning fuel impinging upon the nose cone of the element 31 will be directed down the sides thereof and thus at the base of such cone will encounter the curved surface 37 which will redirect same upwardly away from the top of the piston 32.

Considering now the operation of the present invention and referring again to the drawing thereof, it is herein contemplated that the internal combustion engine shall be operated in a manner similar to that set out in my above-referenced copending patent application wherein a metered flow of fuel, such as gasoline, is provided through the auxiliary air inlet duct 19 to thereby collect above the auxiliary valve 22 during periods of closure thereof. Substantially simultaneous actuation of the auxiliary inlet valve 22 and a primary inlet valve 38 of the engine cylinder, thereupon admits air to both the main combustion chamber 29 and the auxiliary combustion chamber 12. In addition, the opening of the auxiliary valve 22 releases fuel which has collected behind same and which then flows into the auxiliary chamber 12. As the auxiliary valve 22 commences to open in response to conventional valve actuating mechanism and linkage of the motor or engine, air first enters from the duct 19 into the auxiliary combustion chamber 12 through the channel 26 at one side of the inlet valve 22. This air flow is directed by the channel 26 to swirl about the ignition means 21 and a certain proportion of fuel entering through this auxiliary inlet valve 22 will be vaporized by such air flow to thereby form a combustible mixture swirling about the ignition means 21. Excess fuel not vaporized upon entrance to the auxiliary chamber 12 will pass down through same into the fuel trap or trough 27 disposed radially outward of the communicating passage 28 between the auxiliary chamber and main combustion chamber 29. The simultaneous opening of the inlet valve 38 to the main combustion chamber 29 admits to this chamber a charge of air which may, as desired and under appropriate operating conditions of the engine, contain a certain proportion of fuel, but which particularly in the middle power range of the engine is comprised primarily of air in a mixture with the fuel providing a material overabundance of air for that required to entirely oxidize this fuel entering therewith. It will be appreciated that such charging of the auxiliary and main combustion chambers is accomplished with the piston 32 displaced downwardly within the engine cylinder and that simultaneous with the closing of these inlet valves 22 and 38, the piston rises to thereby compress the air taken in during the period that the valves were open. The compression will occur not only in the main cylinder but also in the auxiliary combustion chamber 12 and at an appropriate point in the reciprocal travel of the piston 32, ignition will be accomplished by conventional means striking an arc between electrodes of the spark plug 21 in the auxiliary combustion chamber 12.

At the time of ignition of the vaporized fuel and air swirling about the ignition means 21 in the auxiliary combustion chamber, the auxiliary chamber is substantially closed by the element 31 so that the burning fuel will rapidly expand to raise the pressure therein and insure complete ignition of all fuel. Burning fuel from the auxiliary combustion chamber ejects itself under pressure through the passage 28 into the main combustion chamber 29 as the element 31 moves out of the passage. Not only will the vaporized fuel in the auxiliary combustion chamber be ignited and displaced therefrom but also, liquid fuel which may be trapped in the depression or trough 27 and solids such as minute carbon particles will be likewise affected. There is thus forcibly ejected through the passage 28 into the main combustion chamber a burning mixture of fuel and air having a large fuel-to-air ratio. Such burning mixture will be directed from the passage 28 onto the deflecting member 31 at the nose cone 34 thereof and will consequently be further deflected by the curved surface 37 of the deflecting element to thereby disperse somewhat uniformly throughout the main combustion chamber 29 whereby there are provided a large multiplicity of ignition points or tiny flames within the main ignition chamber. In the instance wherein only compressed air is provided to the main combustion chamber 29, this burning fuel will be spread about the atmosphere of air so that there results an overabundance of air required for complete oxidation of the fuel, and therefore substantially complete fuel combustion results. In the alternate circumstance wherein a portion of the fuel for driving the piston is provided through the main inlet valve 38 directly to the main combustion chamber 29, this diffusion of burning fuel from the auxiliary combustion chamber 12 will thereupon ignite the fuel already in the main combustion chamber. This ignition in the main combustion chamber does not occur at a single point as in conventional engines, but instead occurs over an expanded volume throughout which the burning gases and fuel from the auxiliary combustion chamber are deflected by the deflecting element 31.

There will thus be seen to be provided within the main combustion chamber 29 a substantially uniform fuel combustion wherein substantially complete oxidation of the fuel occurs. This type of uniform combustion thereby provides a highly desirable and uniform impulse to the piston and at the same time extracts the maximum amount of energy from the fuel charge while furthermore entirely burning the fuel to eliminate toxic materials of incomplete combustion normally included in engine exhaust. Scavenging of the cylinder by the return piston stroke ejects or exhausts through exhaust valves provided therein only the products of complete or substantially complete combustion and incompletely burnt material such as carbon monoxide, aldehydes, and ketones are not present in the exhaust gases to thereby pollute the atmosphere into which they are exhausted.

It will be seen from the foregoing description of the present invention and discussion of operation thereof that there is provided by the improved auxiliary combustion chamber configuration, a highly desirable communication between same and the main combustion chamber 29 of the engine together with means for trapping and retaining excess fuel in the auxiliary combustion chamber until such time as burning fuel is expelled into the main combustion chamber, whereupon all of the fuel from the auxiliary combustion chamber is dispersed uniformly throughout the main combustion chamber within the engine cylinder.

The deflecting element 31 is illustrated in the drawing in the position normally occupied thereby at top dead center of piston travel, i.e., at the maximum piston rise, and it will be seen that although the nose cone 34 mates with and extends within the flared passage 28, it does not physically contact same. There is thus always provided a substantial closure of the auxiliary chamber at top-dead-center of the piston without attendant problems of physical contact of moving parts. It has been found advantageous to make the clearance between the nose of the deflecting element and the walls of the passage relatively small, as for example, about .010 to .020 inch at the top of the piston stroke. Furthermore, the taper of the passage 28 and nose cone 34 of the deflecting element 31, may be varied to various angles; however, it has been found suitable to employ an angle of taper of substantially 15°. The deflecting element 31 will be seen not only to operate to deflect and distribute burning fuel throughout the main combustion chamber but also to protect the top of the piston alined with the passage 28 from the auxiliary combustion chamber. This is of some importance inasmuch as the temperature of gases emitted from the auxiliary combustion chamber is normally sufficient to materially damage some automotive engine pistons. Although the deflecting element 31 will of course be raised to a relatively high temperature by extremely hot gases and burning fuel flowing thereover, construction of this element from suitable materials prevents damage thereto, and furthermore, mounting of same as discussed above with an air space between the majority of the undersurface of the element and the top of the piston provides for minimizing the conductivity of heat from the deflecting element to the piston so as to thereby prevent possible warping or other damage of the piston top.

There is provided by the present invention a highly combustible mixture of fuel and air in the vicinity of the ignition means 21 whereby the application of a spark to elements of such means invariably results in ignition of the fuel within the auxiliary chamber. Although the fuel-to-air ratio at the bottom of the auxiliary chamber may be too great for ready ignition, stratification of the charge insures a combustible mixture about the spark plug. There is, in fact, formed within the auxiliary combustion chamber 12 herein provided, a stratified combustible mixture wherein the upper portion of this auxiliary combustion chamber is filled with a highly combustible mixture particularly at the time of closing of the auxiliary inlet valve 22 even though at the bottom of this auxiliary chamber the mixture may be such as to be sufficiently overloaded with fuel as to be very difficult to ignite. While the auxiliary combustion chamber 12 is at least in part filled with a mixture of fuel and air in such ratio that same may not be readily combustible, yet the main combustion chamber 29 is normally maintained in a substantially contrary circumstance wherein the mixture therein has such a high proportion of air-to-fuel ratio as to be not readily combustible. By the expelling of burning gas from the auxiliary combustion chamber into the main combustion chamber these two different types of mixtures are combined and the overall result is an excess of air whereby full and complete oxidation of any and all fuel supplied is not only possible but is, in fact, substantially realized.

What is claimed is:

1. In combination with an internal combustion engine having at least one cylinder containing a reciprocative piston and including a primary inlet valve admitting a full charge of air to a main combustion chamber above the piston once each cycle thereof, means defining an auxiliary combustion chamber for each cylinder communicating by a passage with said cylinder above said piston, an auxiliary inlet valve operated in synchronism with said primary valve for admitting air and fuel into said auxiliary chamber, ignition means in said auxiliary chamber for igniting fuel therein, and a plug affixed atop said piston in alinement with said opening between the cylinder and auxiliary chamber and having curved deflection surfaces thereon directing burning mixtures from said auxiliary chamber about said cylinder above the piston for full mixture with said charge of air in the main combustion chamber whereby the fuel is completely burned.

2. The combination claimed in claim 1 further defined by said passage between the cylinder and auxiliary chamber being tapered outwardly into said cylinder and said plug having a tapered upper end to fit within said opening in closely spaced relation to the periphery thereof at the uppermost point of piston travel, and a curved lower end to diffuse burning fuel from said auxiliary chamber throughout said main combustion chamber whereby the fuel burns in an overabundance of air.

3. Combustion means for an internal combustion engine having a piston reciprocating within a cylinder and receiving a charge of air during each cycle of operation and comprising, means defining an auxiliary combustion chamber above said cylinder and communicating therewith by a central passage, said means defining a depression about said passage outwardly therefrom and smoothly curving into the passage, auxiliary valve means in said auxiliary chamber for admitting thereto both fuel and air whereby unvaporized fuel deposits in said depression, and ignition means in said auxiliary chamber for controllably igniting fuel therein whereby same discharges in a burning state through said passage into said cylinder above said piston for substantially complete combustion therein.

4. Combustion means as claimed in claim 3 further defined by said auxiliary chamber having a depression thereabout from the auxiliary valve means toward the ignition means for deflecting air admitted to said auxiliary chamber through said auxiliary valve in a curved path extending at least in part about said ignition means and insuring thereby a combustible air-fuel mixture adjacent said ignition means.

5. Combustion means for an internal combustion engine having at least one cylinder with a piston reciprocating therein and a primary intake valve for admitting air to the cylinder above said piston comprising means defining an auxiliary combustion chamber for each cylinder and a central opening at the bottom thereof tapered outwardly into said cylinder above the piston therein for providing normally unrestricted communication therebetween, a refractory plug mounted atop said piston in alinement with said passage and having a top tapered at substantially the same angle as said passage for mating therein to substantially close said opening at the uppermost piston position and further having an upwardly curving outer periphery, means admitting fuel and air into said auxiliary chamber, and ignition means adjacent the top of said auxiliary chamber for igniting fuel therein whereby same ejects itself in burning state through said passage into said cylinder for substantially complete combustion in an abundance of air therein.

6. In combination with an internal combustion engine having at least one cylinder with a piston mounted for reciprocation therein and an auxiliary combustion chamber for each cylinder communicating therewith through a passage at the top of same, the improvement comprising a tapered deflecting element formed of a high temperature material mounted atop said piston in minimum contact therewith and in alinement with said passage, said element extending from said piston a distance to dispose the element within said passage and defining a thin annular opening therethrough at maximum piston rise, and said element having a contour curving from the taper thereof back toward the cylinder top to thereby deflect burning gases from the piston and distribute same substantially equally about the cylinder above the piston.

7. In combination with an internal combustion engine having a cylinder with a reciprocating piston therein and an intake valve supplying air to the cylinder, a housing defining a combustion chamber and a central unobstructed passageway extending downwardly therefrom into said cylinder above said piston, said housing defining a pair of openings atop same adapted to receive in one a spark plug and in the other an auxiliary valve controllably providing air and fuel to the chamber, and said housing further defining a fuel trough about the passageway between said cylinder and chamber for receiving unmixed fuel entering the chamber and retaining same until ignition in said chamber whereupon said fuel is ignited and explosively expelled into said cylinder for substantially complete combustion in the densified atmosphere of air therein.

8. In an internal combustion engine having at least one cylinder with a piston mounted for reciprocation therein, an auxiliary combustion chamber for each cylinder communicating through an opening into said cylinder at the top thereof, a primary air intake valve opening into said cylinder and an auxiliary air intake valve opening into said chamber, means operating said valves substantially simultaneously, means metering fuel into said auxiliary chamber through said auxiliary valve, and ignition means in said auxiliary chamber; the improvement comprising a high-temperature resistant member affixed atop said piston in alinement with said opening for cyclically substantially closing same and having outwardly flared edges covering said piston in direct line from said opening and deflecting gases from said chamber about said cylinder for protecting the piston from burning and promoting uniform fuel burning in the cylinder.

9. An internal combustion engine comprising at least one cylinder having a reciprocating piston therein and defining a main combustion chamber in said cylinder above the piston, a housing defining an auxiliary combustion chamber communicating with said cylinder through a normally unrestricted passage in the top of said cylinder, means defining a shallow dish-shaped depression in said auxiliary chamber about said passage for collecting engine fuel, a primary intake valve communicating with said cylinder for admitting air thereto on one stroke of the cycle of operation of the engine, an air inlet duct communicating with said auxiliary chamber atop same, an auxiliary intake valve inset in a wall of said auxiliary chamber in closing relation to the air inlet duct and adapted to operate in synchronism with said primary inlet valve for supplying engine fuel and air to said auxiliary combustion chamber in a very high fuel-to-air ratio, said housing defining a depression on the interior thereof from said inset valve at least in part about ignition means extending into the top of said chamber, and a refractory element mounted atop said piston in alinement with said passage for mating therewith and having an outwardly flaring periphery whereby said element periodically closes said passage during ignition and increased compression in said auxiliary chamber and subsequently opens said passage for the ejection of burning fuel therethrough that is deflected by said element to spread throughout the main combustion chamber and therein experience complete combustion in the overabundance of air in the main combustion chamber.

References Cited in the file of this patent

UNITED STATES PATENTS

| | | |
|---|---|---|
| 1,354,786 | Tartrais | Oct. 5, 1920 |
| 1,417,133 | Berg | May 23, 1922 |
| 1,509,924 | Bjornsson | Sept. 30, 1924 |
| 1,691,173 | Winckler | Nov. 13, 1928 |
| 1,691,182 | Davol | Nov. 13, 1928 |
| 1,750,063 | Sorg | Mar. 11, 1930 |
| 2,827,883 | Goede | Mar. 25, 1958 |
| 2,882,873 | Witzky | Apr. 21, 1959 |